United States Patent [19]
Caron et al.

[11] Patent Number: 6,083,282
[45] Date of Patent: Jul. 4, 2000

[54] CROSS-PROJECT NAMESPACE COMPILER AND METHOD

[75] Inventors: Ilan Gabriel Caron, Redmond; Alan W. Carter, Bellevue; Dennis Mark Canady, Redmond, all of Wash.; Tom Corbett, Eugene, Oreg.

[73] Assignee: Microsoft Corporation, Redmond, Wash.

[21] Appl. No.: 08/904,118

[22] Filed: Jul. 31, 1997

Related U.S. Application Data

[63] Continuation of application No. 08/326,898, Oct. 21, 1994, abandoned.

[51] Int. Cl.$^7$ ....................................................... G06F 9/44
[52] U.S. Cl. ........................... 717/6; 717/2; 717/5; 717/7
[58] Field of Search ..................................... 395/705, 706, 395/707, 708, 709, 500, 701–712; 717/2, 5, 6, 7

[56] References Cited

U.S. PATENT DOCUMENTS

| | | | |
|---|---|---|---|
| 4,931,928 | 6/1990 | Greenfeld | 395/708 |
| 5,146,593 | 9/1992 | Brandle et al. | 395/700 |
| 5,206,951 | 4/1993 | Khoyi et al. | 395/650 |
| 5,500,881 | 3/1996 | Levin et al. | 395/700 |
| 5,794,006 | 8/1998 | Sanderman | 395/500 |

OTHER PUBLICATIONS

The Design and Evolution of C+ +, Bjarne Stroustrup, Chapters 0,1,2,17,18, Mar. 9, 1994.

Wilson et al, "Comparative Programming Languages", 1993, pp. 51–55,122, 123, and 60.

Pyster, "Compiler Design and Construction", 1980, pp. 11, 221–225, 232, and 233.

*Primary Examiner*—Tariq R. Hafiz
*Assistant Examiner*—Todd Ingberg
*Attorney, Agent, or Firm*—Klarquist Sparkman Campbell Leigh & Whinston, LLP

[57] ABSTRACT

In compiling source code organized in projects, unqualified name references are bound to program objects by searching namespaces in ascending hierarchical order from a current program unit to a current project. Namespaces within projects directly referenced by the current project are then searched. The search is completed at the first namespace in the search order which contains the matching name. Thus, program objects in projects directly referenced by the current project can be referenced by an unqualified name, without import or export lists of program elements.

24 Claims, 7 Drawing Sheets

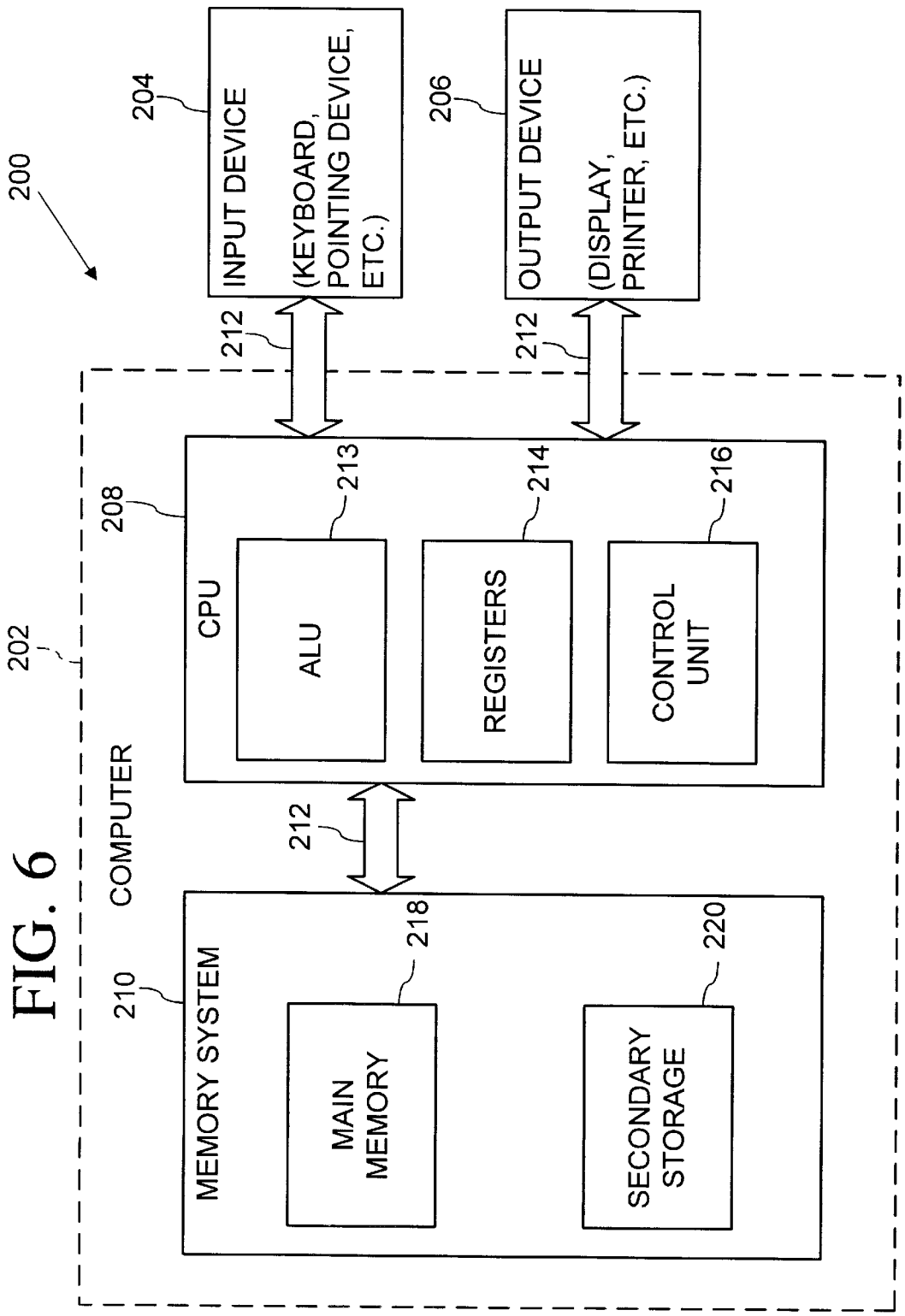

6,083,282

CROSS-PROJECT NAMESPACE COMPILER AND METHOD

This application is a file wrapper continuation of application Ser. No. 08/326,898, filed on Oct. 21, 1994 now abandoned.

FIELD OF THE INVENTION

This invention relates to compiling computer programs written in a high level programming language into executable form, and, more particularly, relates to the availability of program objects for reference within client program units external to the unit in which the objects are declared.

BACKGROUND OF THE INVENTION

Computers operate under the control of a program consisting of coded instructions. Typically, programs are first written in a high level programming language, such as BASIC, PASCAL, C, C++, or the like, which are more readily understood by humans. The high level language statements of the source code are then translated or compiled into the coded instructions executable by the computer. Typically, a software program known as a compiler is used for this purpose. The terms, "source code" and "object code," are often used to describe the form of a program prior to and after compiling, respectively. Accordingly, the term "source code" generally refers to a program in its high level programming language form. "Object code," on the other hand, generally refers to the program in the form of the coded instructions generated by the compiler which are executable on a computer.

Typically, the source code of a programming language is organized in one or more program units, such as procedures, functions, blocks, modules, projects, packages and/or programs. These program units allow larger program tasks to be broken down into smaller units or groups of instructions. For example, in many programming languages, groups of instructions that are repeated frequently in a program can be organized into a single procedure or function. Each place in the source code where the group of instructions would otherwise be repeated, a reference (known as a procedure or function "call") to the procedure or function is instead used. Also, in some programming languages, related statements, procedures and functions are grouped together in program units, such as modules and the like. Some programming language systems are further organized in higher order program units, such as projects or the like, which may include one or more related lower order program units, e.g., modules. Considerable programming effort can be saved in subsequent programming work, by incorporating well-designed modules and projects from previous programs.

Programming effort also can be conserved through the use of a program unit known as a type library. Type libraries contain information defining the types of various program elements which may be incorporated within computer programs written in different programming languages. So that the information can be incorporated in programs written in different programming languages, the type information is made available through a standard procedural interface to application programs, including compilers, and interpreters. Type libraries and their use is described in U.S. patent application Ser. No. 07/959,056, entitled "Method and System for Interfacing to a Type Library," which is hereby incorporated by reference.

In source code, names (also known as identifiers) are generally explicitly assigned in declaration statements, to various program elements, such as variables, functions, procedures, and constants. (In some languages, names also may be assigned implicitly. For example, in FORTRAN, names beginning with i,j, . . . ,n are implicitly integer variables.) Typically, the declaration statements recite a name which is to be assigned to a program element, along with attributes of the program object (e.g. integer, string, array, etc . . . ). Other statements which operate on program elements, such as procedure calls, expressions, assignments, and the like, make reference to the program elements using their assigned names.

High level programming languages generally impose rules governing the scope of names (i.e. where a particular name is available in a program for referencing the associated program object). With statically scoped programming languages, names have a scope commensurate with the program unit in which they are declared. For example, names declared in a procedure generally are only available (i.e. in scope) within the procedure. Names declared in a module or project are generally available only within the module or project (and in its subunits). The names available within a particular program unit are generally referred to as the namespace of the unit.

As a part of the compiling process generally known as "binding" names to program elements, name references in the source code are matched to program elements currently in scope. Generally, to match a name to a program elements, previous compilers search the namespaces of the program units in which the name reference is located from a lowest order unit (e.g. a current procedure) to a highest order unit (e.g. a current project). If this search doesn't locate a program element with a matching name in these namespaces, the compiler generates an error.

In writing source code, it is sometimes desirable to make the names of program elements (hereafter "external program objects") declared within one program unit available for referencing within another program unit (hereafter "client program unit"). For example, it may be useful to include a function call within a client project which references an external function declared in another project. By making the external function available for reference within the client project, one can avoid having to declare the external function anew in the client project. Further, any subsequent changes to the external function can then be made to a single declaration of that function, thus avoiding possibly inconsistent multiple declarations of the function. Similar advantages attain for variables, constants, and other program elements.

In previous programming language systems, some mechanisms have been provided which permit access to external program elements. With some programming languages, such as Ada and Modula, the programmer writes an explicit export list in the source code for a program unit which contains the names of program elements which are to be made available for access within other, client program units. With some other programming languages, explicit import lists are used to identify external program elements which are to be made accessible within a client program unit. The Modula programming language, for example, employs both explicit export and import lists. As another example, the Ada programming language uses explicit import lists for separately compilable program units, and a declarations section which serves some of the same purposes as an export list. Such export or import lists generally take the form of a header file associated with the program unit or a statement within the program unit. The difficulty with these mechanisms is that they place an added burden on the programmer to maintain and update such lists as access to additional external program elements becomes necessary. The lists also add to the length and complexity of the source code, resulting in an increased opportunity for coding errors.

Additionally, in some programming language systems, access to external program elements within a client program unit is made with a "qualified" name reference. The name referencing a program element is qualified by adding or prefacing a name identifying the program unit in which it is declared. Typically the program unit name and program element name are separated by a "." or other delimiter. For example, an external program element named "PObj" which is declared in the program unit "PUnit" may be accessed with the qualified name, "PUnit.PObj." Where the source code is organized in several orders or levels of program units, the qualified name reference may comprise a string of program unit names. For example, a qualified name reference to access a function, "Func," declared in a module, "Mod," within a project, "Proj," may require the string of names, "Proj.Mod.Func." Again, this mechanism places an added burden on the programmer in that the program unit in which an external program element is declared must be explicitly recited in the source code each time the element is referenced. Accordingly, the programmer must mentally or otherwise keep track of numerous external program elements and the program units in which they are declared. With explicit qualification, the programmer also is required to recite a lengthier name reference to access external program elements, thus increasing the possibility of coding errors.

An object of the invention is to permit references to external program elements within a client program unit without resort to explicit qualification. Another object is to permit references to external program elements without explicit, programmer-written export or import lists of externally provided program elements. Yet another object of the invention is to enlarge the namespace of program units to include at least some external program elements of other program units. A further object of the invention is to provide access to external program elements of type libraries substantially equal to the access to external program elements of native program units.

SUMMARY OF THE INVENTION

The present invention provides a compiler and method to make external program elements available for access within a client program unit without export lists, import lists, or qualified name references.

According to the invention, the source code of a program is organized by the programmer in a plurality of projects, or like program units. (For expository convenience, such program units are hereafter referred to as "projects".) In each project of the source code, the programmer may include references to other projects and references to type libraries. The project which includes such references is said to be a "client" project. The projects and type libraries indicated by the references are said to be "directly referenced" by the client project. The directly referenced projects may, in turn, include references to yet other projects and type libraries, which are said to be "indirectly referenced" by the client project. Within each client project of the source code, the programmer also may include unqualified name references to external program elements declared in the client project's directly referenced projects and type libraries. Accordingly, by creating a reference in a client project to another project or type library, the public names of program elements in the referenced project or type library are made available for unqualified reference in the client project without requiring an explicit export or import list of program elements.

To bind unqualified names to program elements during compiling, the namespaces associated with the client project are searched for a corresponding name. In a preferred embodiment of the invention, the namespaces of program units in the client project are searched in a hierarchical order from that of the lowest order unit containing the unqualified name to the client project's namespace. The namespaces of any projects and type libraries that are directly referenced by the client project also are searched for a corresponding name. In the preferred embodiment, the namespaces of the directly referenced projects and type libraries are searched in an order in which they are referenced within the client project. The search is completed at the first namespace in the search order which contains the corresponding name. The unqualified name is then bound to the program element associated with the corresponding name. If no corresponding name is found after searching these namespaces, the compiler generates an error message to notify the programmer.

In the preferred embodiment of the invention, the same binding process is applied to bind names which reference external program elements from another project as is applied when binding names which reference external program elements from type libraries. Accordingly, type libraries (which are language independent program units) are treated by the compiler as if a native program unit of the programming language. Further, in some embodiments of the invention, the process of binding name references to external program elements is accomplished utilizing an identical procedural interface for both projects and type libraries.

In a further aspect of the preferred embodiment of the invention, references within a project to other projects and type libraries are created automatically by a host development environment. Further, a list of such referenced projects and type libraries in a project is modifiable through a user interface of the development environment. Accordingly, such project and type library references are generated implicitly, and cannot be expressed in the preferred programming language.

Additional features and advantages of the invention will be made apparent from the following detailed description of a preferred embodiment which proceeds with reference to the accompanying drawings.

BRIEF DESCRIPTION OF THE DRAWINGS

FIG. 6 is a block diagram of a computer system that may be used to implement a method and apparatus embodying the invention for compiling source code having name references to external program elements, such as the compiling process of FIG. 4 including the binding process of FIGS. 5 and 5A.

DETAILED DESCRIPTION OF A PREFERRED EMBODIMENT

Figure 1:
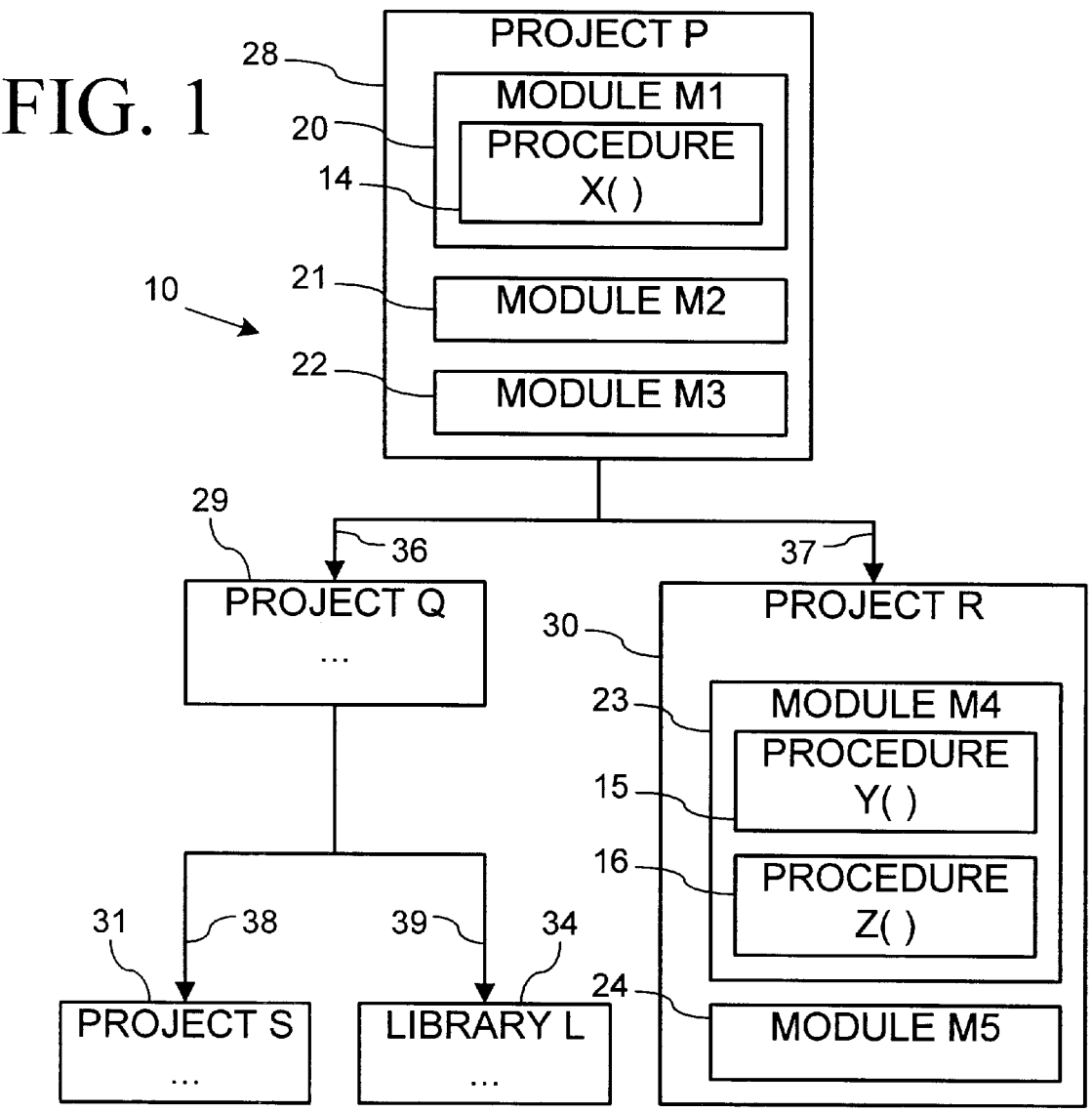
FIG. 1 is a block diagram of a source code organized in procedures, modules, and projects, and containing names in a client project, which reference external program elements according to the invention.

With reference to FIG. 1, an exemplary source code 10 which may be compiled according to the invention is organized in procedures 14–16, modules 20–24, projects 28–31, and type libraries 34. In the preferred embodiment of the invention, a programmer writes the source code 10 according to a syntax of Microsoft Corporation's Visual Basic® for applications language system. The source code can be written using a word processing software or editor. Preferably, the source code is written using a program development software (referred to herein as an integrated development environment or IDE) which provides a plurality of software tools with a single convenient user interface for creating and editing source code.

In accordance with the invention, the source code 10 may contain one or more names within a client project which reference program elements declared in other projects without the programmer providing qualifiers, or any import or export list of program elements. Such unqualified names are bound to elements external to the client program unit by a compiler using a novel binding method described more fully below.

In writing the source code 10, a programmer preferably organizes the source code 10 into program units referred to herein as projects. In the programming language of the preferred embodiment, a project is a collection of modules, references 36–39 to other projects, and references to application type libraries. For example, the project 28 in the source code 10 contains the modules 20–22, and references 36, 37 to the projects 29 and 30. As another example, the project 29 contains modules (not shown), a reference 38 to the project 31, and a reference 39 to a library 34.

The programming language of the preferred embodiment, Visual Basic®, is designed for use in writing custom programs that integrate into various commercially available application software, such as Microsoft Excel®, Access®, and Word, so as to customize these applications. Integration with application programs is accomplished, in part, by providing application type libraries for each application, such as the type library 34, containing program elements used for interacting with or controlling the application. The type library 34 preferably conforms to the model defined in U.S. patent application Ser. No. 07/959,056, entitled "Method and System for Interfacing to a Type Library," previously incorporated herein by reference.

In the preferred embodiment, the references in a project to other projects and type libraries are created automatically by the IDE and can be modified by a programmer through interaction with the user interface of the IDE, such as by appropriate menu selections and text entry, or otherwise. In this case, the reference may take the form of an exclusively machine-readable code in a file containing the source code 10. In alternative embodiments of the invention these references to other projects and type libraries may be created by the programmer writing statements in the source code 10 such as the following:

Referenced Projects=OtherProg, OtherTypeLib  (1)

However, in the preferred embodiment of the invention, a list of referenced projects and libraries are created outside the programming language through commands provided in the user interface of the integrated development environment. In the preferred embodiment, references to projects and libraries are ordered, such as by an order in which the references appear in a project or in which the references were created by a programmer.

By creating a reference in a project to another project or library, a relationship between the projects and/or libraries is formed. The project containing the project or library reference is said to be a client project of the project or library that it references. The project or library that the client project references is said to be a directly referenced project or library of the client project. For example, because the project 28 contains references to the projects 29, 30, the projects 29, 30 are directly referenced projects of the client project 28. Directly referenced projects may, in turn, include references to yet other projects and type libraries, which are said to be "indirectly referenced" by the client project. For example, the project 31 and the library 34 (which are each referenced by the directly referenced project 29 of the client project 28) are considered to be indirectly referenced by the client project 28.

A module in the programming language of the preferred embodiment is a container for program elements, such as procedures, and data (referred to as module "members"), as well as type declarations. In the source code 10, for example, the module 20 contains the procedure 14, and the module 23 contains procedures 15 and 16. Data members can be declared as constants, variables, or records, and are typically declared in statements such as the following:

Public anInt As Integer  (2)

Private aNum As Double  (3)

(Words presented in bold text in the statements illustrated herein are reserved words of the programming language.) Constants and variables are intrinsic (language defined) data elements of the programming language. Records are data elements defined by a type declaration as a collection of intrinsic data elements, and/or other records. The following type declaration, for example, defines a particular record, "bar," as a collection containing two intrinsic data elements, an integer "x" and a single "y".

Type bar x As Integer y As Single

End Type  (4)

Procedures in the programming language of the preferred embodiment are groups of statements for performing one or more operations. (The preferred programming language refers to procedures which return a value as a "function." For expository convenience, the term "procedure" is used herein to refer to both procedures and functions.) The statements include language defined operations on intrinsic data elements, calls to other procedures, and the like. Procedures may also include declarations of local variables used within the procedure. For example, local variables in procedures are declared in statements such as the following:

Dim anint As Integer    (5)

which appear within a procedure statement such as the following:

Sub foo (i As Integer)

...

End Sub    (6)

The exemplary statements (1)–(6) above each declare a name for a particular program element. Other statements which perform operations on the program element, reference the element using its declared name. (The names appearing in such non-declarative statements are referred to herein as referencing names or name references.) In the syntax of the programming language used in the preferred embodiment, names (also known as identifiers) are strings of characters which are subject to the following four rules: (1) begin with a letter, (2) contain only letters, numbers, and the underscore character, (3) are no longer than 255 characters, and (4) contain no reserved words. However, according to the programming language of the preferred embodiment, the scope or availability of a name for referencing its associated program element is limited to particular ones of the procedures, modules, or projects in which the source code 10 is organized by the programmer.

Figure 2:
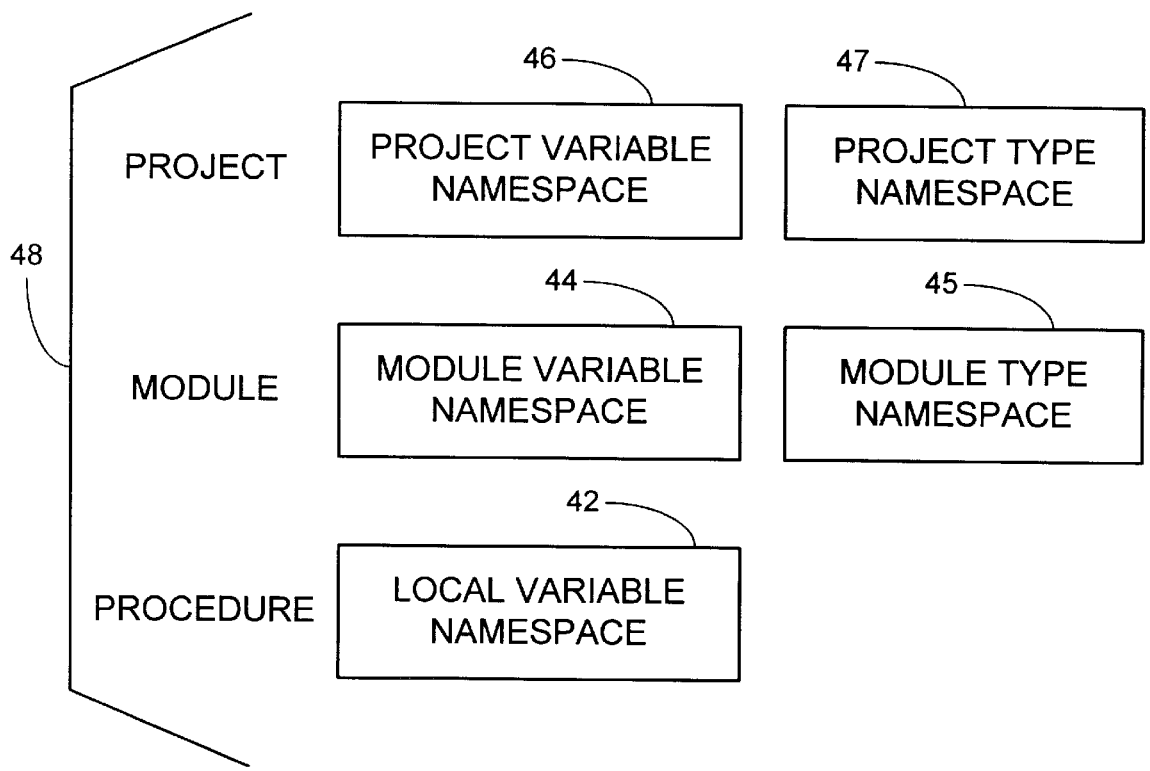
FIG. 2 is a block diagram illustrating a namespace hierarchy of the source code of FIG. 1.

With reference to FIG. 2, the scope of availability of names within the source code 10 is determined according to the organization of the source code by the programmer into various program units, and further according to a namespace hierarchy 48. A namespace is a collection of names for program elements available within a procedure, module, or project and includes the names of each program element declared within the unit. Thus, by virtue of the programmer including a program element's declaration within a program unit, the program element's name is in the namespace of that program unit. More specifically, each procedure 14–16 of the source code 10 (FIG. 1) has a namespace 42 (herein referred to as a "local variable namespace") which includes the names of local variables and constants declared (explicitly or implicitly) within the particular procedure. Modules 20–24 (FIG. 1) preferably have two separate namespaces. One namespace 44 of each module (referred to herein as a "variable namespace") contains names of data members and procedures of the module. Each module also has a separate namespace 45 (referred to herein as a "type namespace") which contains names of types declared in the module. Each project 28–31 (FIG. 1) has corresponding namespaces 46, 47 (herein referred to as a "project variable namespace" 46 and a "project type namespace" 47). To enable explicit qualification (described below) of variables, procedures, and types, a project's variable and type namespaces 46, 47 also both include a name of the project itself and names of modules contained in the project. Within each namespace, names are required to be unique. In other words, no two program elements in a namespace may be assigned identical names.

In the preferred embodiment, the namespaces 42, 44–45, and 46–47 of the program units in the source code 10 (FIG. 1) are ordered according to the namespace hierarchy 48. In the hierarchy 48, the local variable namespace 42 of a procedure is at a lowest level. Above the local variable namespace 42 is the variable namespace 44 and type namespace 45 of a module containing the procedure. A type namespace 46 and a variable namespace 47 of a project containing the module is at a highest level in the hierarchy 48.

Figure 3:
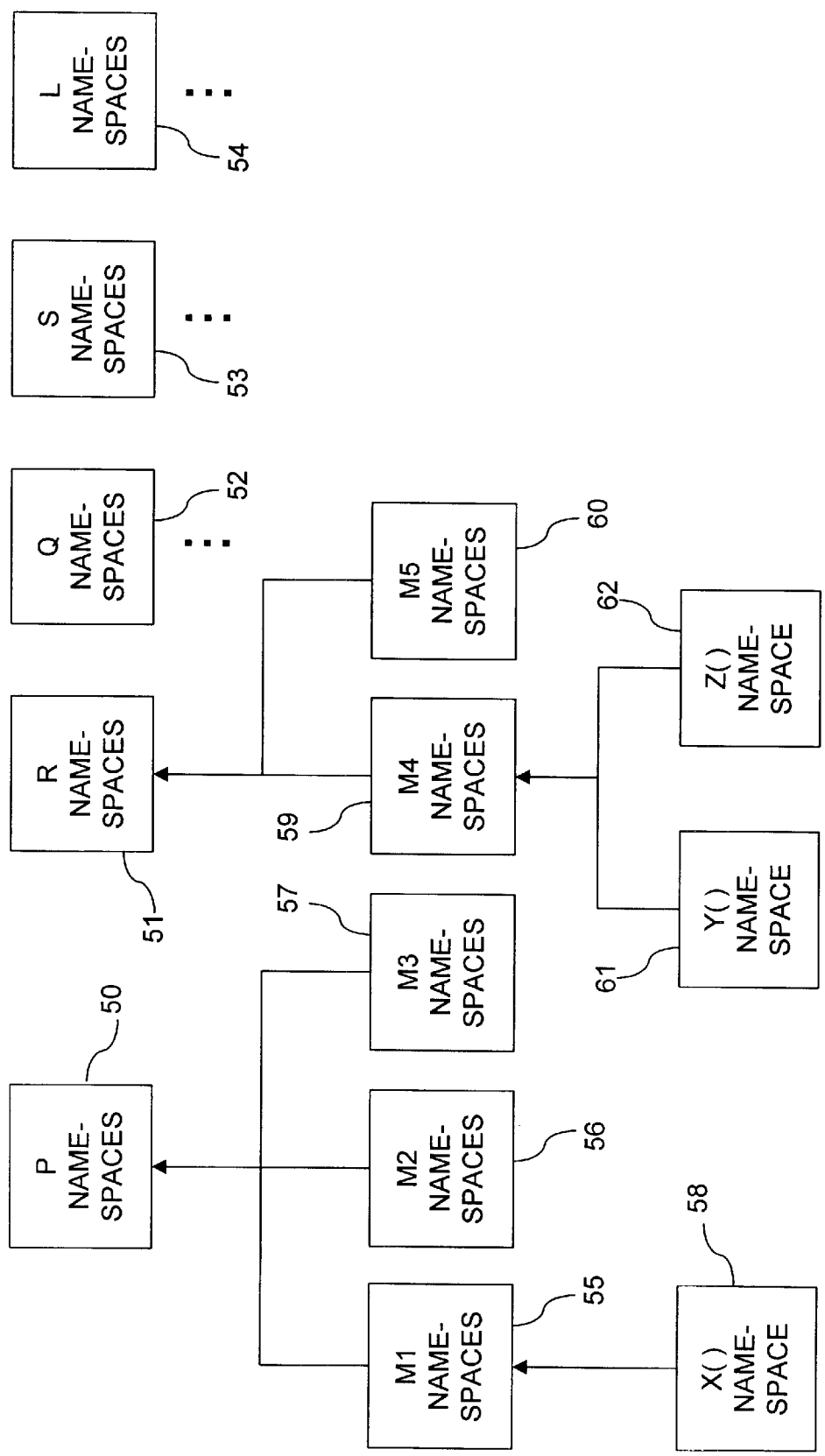
FIG. 3 is a block diagram illustrating the namespaces of the procedures, modules and projects of the source code of FIG. 1 ordered according to the hierarchy of FIG. 2.

With reference to FIG. 3, when ordered according to the hierarchy 48, for example, namespaces 50–62 for the procedures 14–16, modules 20–24, projects 28–31, and library 34 of the source code 10 are ordered as follows. Variable and type namespaces 50–54 for the projects 28–31 and library 34 are considered to be at the highest level. Under the namespaces 50 of the project 28 are the type and variable namespaces 55–57 of the modules 20–22 within the project. The local variable namespace 58 of the procedure 14 which is contained within the module 20, is under the namespaces 55 of the module 20. Likewise, namespaces 59–60 of the modules 23–24 which are contained within the project 30, are under the namespaces 51 of the project 30. The local variable namespaces 61–62 of the procedures 15, 16 also are under the namespaces 59 of the module 23 which contains these procedures.

Referring again to FIG. 1, in the programming language of the preferred embodiment, names appearing in a current program unit can reference (without qualification) any program elements whose names are included in the current program unit's namespace or those namespaces above it in the hierarchy 48 (FIG. 2) of any program unit containing the current program unit. For example, a name appearing in the procedure 14 can reference any program element whose name resides in a local variable namespace of that procedure, or in the namespaces of the module 20 and project 28 in which the procedure is located. Names also can reference data members, which have been declared as public, of other modules in the same project without qualification. For example, an identifier residing in the procedure 14 also can reference names of public module members in the variable namespace of modules 21 or 22. Further, according to the invention, names (without qualification) also can reference program elements whose names reside in the namespaces of another directly referenced project or type library, or their module's public data members. For example, a name appearing in the procedure 14 can reference program elements whose names reside in the namespaces of projects 29 and 30, and names of public data members of modules 23 and 24.

To reference program elements whose names are not currently in scope (e.g., a program element whose name resides in the namespace of an indirectly referenced project), name references must be qualified by prefixing additional names (known as "qualifiers") separated by a period (".") which specify a path to the project in which the name resides. For example, a name, e.g., "anelement," appearing in the procedure 14 can reference a program elements whose name resides in the namespace of the project "S" 31 (which is not directly referenced by program P 28) by prefixing names "Q" and "S" of projects 29, 31 in a path of project references 36, 38 from the project "P" 28, such as the following:

Q.S.anelement    (6)

Qualified names are interpreted as if they appeared in the program unit specified by its qualifiers. Explicit qualification of name references can always be used even when unnecessary (such as when the name of the program element resides in the namespace of a directly referenced project).

Figure 4:
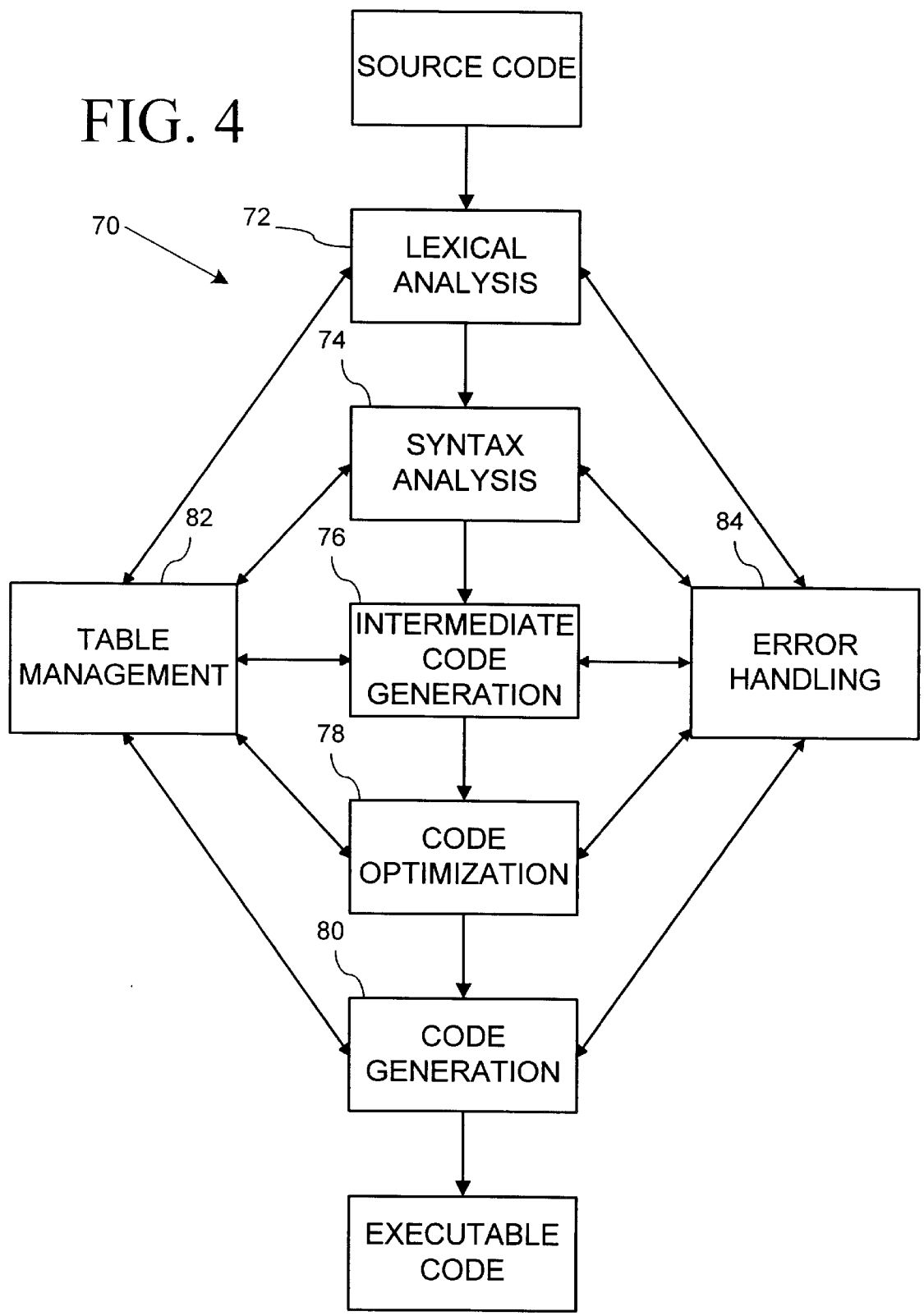
FIG. 4 is a flow chart of a conventional process for compiling source code.

Referring now to FIG. 4, source code, which may contain one or more names referencing program elements whose names reside in the namespaces of other projects and type libraries, is compiled according to the invention by a process 70 into executable code for a computer program. The compiling process 70 can comprise various subprocesses that are known in the art (and therefore not explained in detail herein), such as lexical analysis 72, syntax analysis 74, intermediate code generation 76, code optimization 78, executable code generation 80, table management 82, and error handling 84, and additionally includes the steps of a binding method 90 illustrated in FIG. 5. With the addition of the binding method 90 described more fully below, the compiling process is able to compile source code having names references to external program elements whose names reside in the namespaces of directly referenced projects and libraries (e.g., the source code 10) without name qualification, or export and import lists for program elements. Preferably, the compiling process 70 is performed by a software program known as a compiler (not shown) running on a general purpose computer (see FIG. 6).

In the compiling process 70, lexical analysis 72 is first performed on source code to separate the source code into various lexical constructs or tokens of the programming language, including identifiers, keywords, operators, literals, and comments. Syntax analysis 74 also is performed to separate the source code into syntax structures, such as declaration statements, loop statements, expressions, and the like. Executable code for each of these language structures is then generated 76, 78, 80. Code generation may be done in any number of stages, but preferably includes generating 76 an intermediate code form of the program, then performing various optimizing procedures 78 to reduce the size and increase the speed of the resulting program before generating 80 executable code for the program.

During the above stages 72, 74, 76, 78, 80 of the compiling process 70, the compiler determines which names reside in the various namespaces of the procedures, modules, and projects in the source code. This determination (indicated generally as table management 82) is made as the compiler interprets declaration statements appearing in those procedures, modules and projects, such as the statements (1)–(5) above. The compiler stores the names for each namespace in a data structure sometimes referred to in the art as a symbol table. These symbol tables are preferably implemented as hash tables or binary search trees, but alternatively may be implemented as any of various list or set collection structures known in the art.

Figure 5:
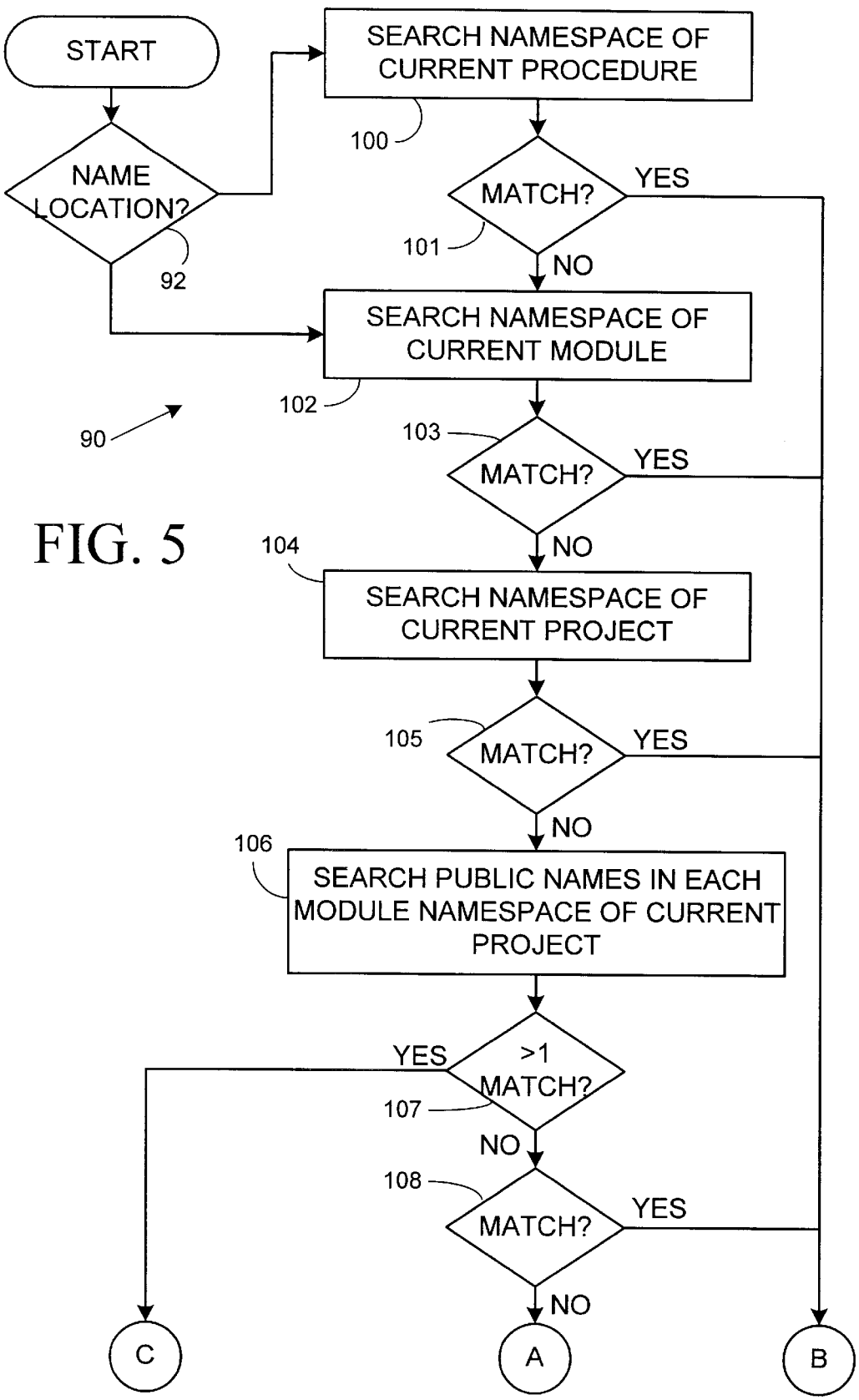
FIGS. 5 and 5A are a flow chart of a binding method according to a preferred embodiment of the invention which is incorporated in a compiling process, such as the compiling process of FIG. 4, to compile source code having name references to external program elements, such as the source code of FIG. 1.
Figure 5A:
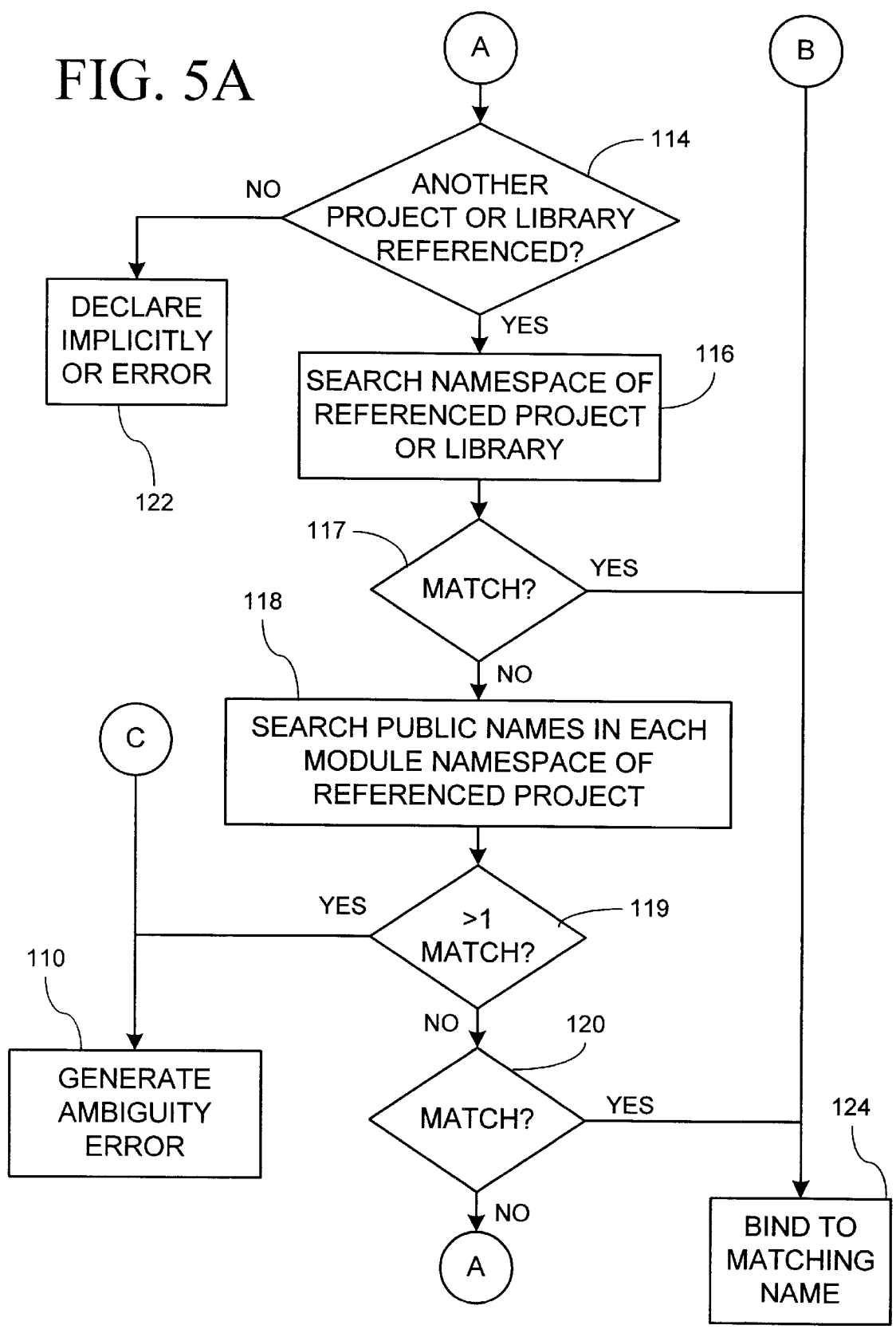

With reference to FIGS. 5 and 5A generally, as a part of the compiling process referred to above as intermediate code generation 76 (FIG. 4) (although alternatively incorporated in another of the stages of the compiling process 70), the compiler performs the method 90 for binding names in source code to program elements. In accordance with the programming language of the preferred embodiment, name references which require binding appear in procedures and modules. To bind these name references, the compiler locates a name of a program element identical to the name reference by searching the namespaces of various procedures, modules, and projects of the source code in a particular order. The order in which the compiler searches the namespaces preferably begins at a namespace of the hierarchy 48 (FIG. 2) for a current procedure or module where the referencing name appears. The order then proceeds up the hierarchy 48 to the namespace of a current project, and proceeds to the namespaces in hierarchies of each project directly referenced by the current project.

More specifically, when the compiler encounters a name reference in the source code requiring binding, the compiler performs the steps of the method 90. The method 90 is performed for both names which reference types and names which reference data or procedure members. However, in the case of names which reference types, the type namespace of the respective module or project is searched. In the case of names which reference data and procedures, the variable namespaces of the respective procedure, module or project is searched. Whether a name references program elements in a type or variable namespace is determined by the compiler from its context in the source code (i.e. where it appears in a source code statement) through the syntax analysis subprocess 74 (FIG. 4).

As indicated at step 92, the compiling process 70 begins at step 100 or 102 depending on whether the name reference is encountered at the procedure or the module level. If the name reference appears in a procedure (the "current procedure"), the compiler begins at step 100 by searching the namespace of that procedure for an identical name. However, if the name reference appears instead at the module level, the compiler begins at step 102 by searching the namespace of that module. For example, if the name reference appears in the procedure 14 (FIG. 1), the compiler first searches that procedure's namespace. However, if the name reference appears external to the procedure 14, but within the module 20 (FIG. 1), the compiler first searches the module's namespace.

After the initial namespace searched at the step 100 or 102, the compiler searches namespaces in a particular search order for a matching name. As indicated at step 101 (and subsequent steps 103, 105, 108, 117, and 120), whenever the namespace (or namespaces) searched at a particular step (e.g., steps 100, 102, 104, 106, and 116) in the search order doesn't contain a matching name, the compiler continues by searching the namespace (or namespaces) at the next step of the search order. Initially, the search order proceeds at the next level up in the hierarchy 48 from the level where the name reference appears, i.e. the namespace of the current module (step 102), and then the project variable namespace (step 104). For example, for a name reference appearing in the procedure 14 (FIG. 1), the compiler next (after an initial search of the procedure's namespace) searches the respective type or variable namespaces of the module 20 (depending on whether the name references a type data or procedure program element) at step 102, then that of the project 28 at step 104. If the name reference appears in the module 20, the compiler searches the respective type or variable namespace of the project 28 at step 104 after its initial search of the respective type or variable namespace of the module 20.

The search order continues with a search of the namespaces of remaining modules in the current project for a public name matching the name reference (step 106). For example, for any name references appearing in the procedure 14 or module 20 (FIG. 1), the compiler also searches the namespaces of the other modules 21 and 22 in the same project 28 for a matching public name.

Then, for each project or library directly referenced by the current project, the project namespace of the directly referenced project is searched (step 116), and the namespaces of each module in the directly referenced project or library is searched for a matching public data member name (step 118). The namespaces of directly referenced projects and libraries (and their respective modules) preferably are searched in a predetermined order, such as in the order by which the projects and libraries are referenced in the current project. For example, for a name reference appearing in the procedure 14 (FIG. 1), the compiler's search order includes the namespaces of the projects 29, 30 which are directly referenced by the current project 28. The compiler's search order also includes the public names in the namespaces of the modules 23, 24 in those directly referenced projects 29, 30. The namespaces of the project 31 and library 34 which are indirectly referenced by the current project 28 are not searched.

At the steps 106 and 118, where the namespaces of modules are searched for a matching public name, the compiler generates an ambiguity error message (step 110) if the namespaces of more than one of the modules contain public names matching the referencing names (steps 107, 119).

If, after searching namespaces in all directly referenced projects and libraries without finding any matching name (i.e., no other directly referenced project or library namespaces remain to be searched, step 114), the name is considered to be declared implicitly as a variable having a default type (step 122). The name is then added to the namespace of the current procedure or module in which it appears. However, if implicit declaration of variables is not permitted, an error is instead generated by the compiler. In the preferred embodiment of the invention, a statement can be included in the source code which sets a compiler option to prevent implicit declaration of variables, such as by the following:

Option Explicit                                        (7)

When a name identical to the referencing name is found in the namespace (or namespaces) searched at any of the steps 100, 102, 104, 106, 116, or 118 in the search order, the search is considered complete (steps 101, 103, 105, 108, 117 and 120) and the method 90 branches to step 124. For example, the search is halted at a first of the referenced projects or type libraries whose namespace(s) are found to contain the matching name (steps 117, 120) without continuing to search the namespace(s) of any remaining referenced projects or type libraries. The compiler then binds the referencing name to the matching name of a program element (step 124). After completing any of the steps 110, 122, or 124, the compiler has completed the process 90 of binding the particular referencing name to a name of a program element. The compiler returns to the compiling process 70 (e.g., at intermediate code generation subprocedure 76) until another name requiring binding is encountered in the source code.

The compiler in some embodiments of the invention utilizes the procedural interface for type libraries defined in U.S. patent application Ser. No. 07/959,056, entitled "Method and System for Interfacing to a Type Library," previously incorporated herein by reference, to both search the namespace of a directly referenced library and to bind a name reference to a program element whose name resides therein. For example, for a name reference appearing in a module (not shown) of the project 29 (FIG. 1), the compiler utilizes the type library procedural interface to search the namespace of the library 34 (FIG. 1) at steps 114 and 118, and if a matching name is found therein, to bind to the named program element. In the language system of the preferred embodiment, an identical procedural interface is provided for interfacing with projects. Accordingly, searching namespaces associated with projects and binding to program elements named therein can be accomplished through an identical procedural interface.

FIG. 6 is a block diagram of a computer system 200 which is used to implement a method and apparatus embodying the invention. Computer system 200 includes as its basic elements a computer 202, input device 204 and output device 206.

Computer 202 generally includes a central processing unit (CPU) 208 and a memory system 210 that communicate through a bus structure 212. CPU 208 includes an arithmetic logic unit (ALU) 213 for performing computations, registers 214 for temporary storage of data and instructions and a control unit 216 for controlling the operation of computer system 200 in response to instructions from a computer program such as an application or an operating system.

Memory system 210 generally includes high-speed main memory 218 in the form of a medium such as random access memory (RAM) and read only memory (ROM) semiconductor devices and secondary storage 220 in the form of a medium such as floppy disks, hard disks, tape, CD-ROM, etc. and other devices that use optical or magnetic recording material. Main memory 218 stores programs such as a computer's operating system and currently running application programs. Main memory 218 also includes video display memory for displaying images through a display device.

Input device 204 and output device 206 are typically peripheral devices connected by bus structure 212 to computer 202. Input device 204 may be a keyboard, modem, pointing device, pen, or other device for providing input data to the computer. Output device 206 may be a display device, printer, sound device or other device for providing output data from the computer.

It should be understood that FIG. 6 is a block diagram illustrating the basic elements of a general purpose computer system; the figure is not intended to illustrate a specific architecture for a computer system 200. For example, no particular bus structure is shown because various bus structures known in the field of computer design may be used to interconnect the elements of the computer system in a number of ways, as desired. CPU 208 may be comprised of a discrete ALU 213, registers 214 and control unit 216 or may be a single device in which these parts of the CPU are integrated together, such as in a microprocessor. Moreover, the number and arrangement of the elements of the computer system may be varied from what is shown and described in ways known in the art (i.e., multiple CPUs, client-server systems, computer networking, etc.).

Having described and illustrated the principles of our invention with reference to a preferred embodiment, it will be recognized that the preferred embodiment can be modified in arrangement and detail without departing from such principles. In view of the many possible embodiments to which the principles of our invention may be put, it should be recognized that the detailed embodiments are illustrative only and should not be taken as limiting the scope of our invention. Rather, we claim as our invention all such embodiments as may come within the scope and spirit of the following claims and equivalents thereto.

We claim:

1. A method performed by program code executing in a computer of compiling source code organized in a plurality of blocks of text, the blocks including a plurality of outermost blocks and inner blocks enclosed in the outermost blocks, where the outermost blocks are not enclosed in any other block, wherein each block has an associated namespace, the method comprising for an unqualified referencing name in a current inner block of the source code:

searching for a matching name of a program object in a namespace associated with a current outermost block which encloses the current inner block containing the unqualified referencing name;

if no matching name is found in the namespace associated with the current outermost block and a second outermost block not enclosing and not enclosed in the current outermost block is directly referenced in the current outermost block, searching for a matching name of a program object in a namespace associated with the second outermost block; and if a matching name is found, binding the unqualified referencing name to the program object having the matching name.

2. The method of claim 1 comprising:

if more than one other outermost block is directly referenced in the current outermost block, searching for a matching name of a program object in namespaces associated with the directly referenced outermost blocks one-by-one according to a predetermined search order; and halting the search when the matching name is found in one of the namespaces associated with the directly referenced outermost blocks.

3. The method of claim 2 wherein the search order is an order in which the other outermost blocks are directly referenced in the current outermost block.

4. The method of claim 2 wherein the directly referenced outermost blocks include a type library.

5. The method of claim 2 wherein the step of searching the namespace associated with the directly referenced outermost blocks comprises, for each directly referenced outermost block's namespace searched:

searching for a matching name in a namespace associated with each module of the directly referenced outermost block; and if a matching name is found in more than one module's namespace in the directly referenced outermost block, generating an error message.

6. The method of claim 5 comprising:

limiting the search for a matching name in the namespace associated with each module of the directly referenced outermost block to public names in said module.

7. The method of claim 1 wherein the directly referenced outermost block is a type library.

8. The method of claim 1 wherein the current outermost block is a current project, the current inner block is a current procedure in a current module of the current project that contains the unqualified referencing name, the step of searching for a matching name in a namespace associated with the current project comprises:

searching for a matching name in a namespace associated with a current procedure of the current project;

if no matching name is found in the namespace associated with the current procedure, searching for a matching name in a namespace associated with a current module of the current project; and if no matching name is found in the namespace associated with the current module and the current project contains more than one module, searching for a matching name in namespaces associated with other modules of the current project.

9. The method of claim 8 comprising:

if a matching name is found in namespaces associated with more than one of the modules in the current project other than the current module, generating an error message.

10. The method of claim 8 wherein namespaces associated with at least one of said other modules include at least one non-public name, the method further comprising:

limiting the search for a matching name in the namespaces associated with other modules of the current project to public names in said other modules.

11. The method of claim 8 wherein the step of searching for a matching name in a namespace associated with a current project comprises:

for each module in the current project, forming a collection of names available in the module;

for each procedure in the current project, forming a collection of names available in the procedure;

searching for a matching name in the collection of names available in the current procedure;

if no matching name is found in the collection of names available in the current procedure, searching for a matching name in the collection of names available in a current module of the current project; and if no matching name is found in the collection of names available in the current module and the current project contains more than one module, searching for a matching name out of any public names in the collections of names available in other modules of the current project.

12. The method of claim 11 wherein at least one module in one of the directly reference outermost blocks contains a non-public name, and wherein the step of searching for a matching name in the one or more directly referenced outermost blocks comprises for each project searched:

for each module in the directly referenced project, forming a collection of names available in the module; and searching for a matching name out of any public names in each module's collection of names.

13. An apparatus for compiling source code organized in a plurality of units wherein a plurality of outer container units contain inner units in one or more levels of containment, and an outer container unit may be related as a client of other outer container units, comprising:

a lexical analyzer for separating the source code into identifiers and other tokens;

a table manager for storing collections of names residing in hierarchies of namespaces associated with the units in each outer container unit in the source code, the namespaces in each outer container unit's hierarchy arranged according to a containment relationship of the associated unit to the outer container unit with a namespace associated with the outer container unit at a top of the hierarchy;

means for performing a search for a matching name of an unqualified identifier located in a current inner unit within a current outer container unit in the source code according to a search order wherein the collections of names are searched in an upward hierarchical order of namespaces in the current outer container unit, then in a downward hierarchical order of namespaces in any outer container units to which the current outer container unit is related as a client; and means for, if the matching name is found, binding the matching name to the unqualified identifier.

14. The apparatus of claim 13 wherein the current inner unit is a current procedure contained in a current module of the current outer containment unit, wherein the current outer container unit contains other modules that do not contain the current procedure, and wherein the upward hierarchical order of namespaces in the current outer container unit comprises a local variable namespace of a current procedure, a variable namespace of a current module, a namespace of the current outer container unit, and namespaces of the other modules in the current outer container unit.

15. The apparatus of claim 13 wherein the downward hierarchical order of namespaces in any other outer container units of which the current outer container unit is related as a client comprises a namespace of said other outer container unit, and namespaces of modules in said other outer container unit.

16. The apparatus of claim 13 comprising:

means for generating an ambiguity error if a matching name is found in more than one of the namespaces of modules in an outer container unit.

17. The apparatus of claim 13 wherein the table manager additionally stores collections of names residing in hierarchies of namespaces of any type libraries included in the source code, and wherein the search order includes the namespaces of any type libraries to which the current outer container unit is related as a client.

18. In a computer, a method of compiling a source code organized as a plurality of hierarchically ordered program units including outer container units which may contain references to other outer container units and libraries of the source code, the method comprising:

for each of the hierarchically ordered program units of the source code, forming a namespace having a collection of names of program objects defined in the program unit; and for each unqualified name referencing a program object appearing in the source code, searching for a matching name in the namespaces for the program units according to a search order wherein the namespaces are searched in an upward hierarchical order in a current outer container unit from a program unit in which the referencing name appears, then in a downward hierarchical order in any other outer container units and libraries directly referenced within the current outer container unit, said any other outer container units not being contained in and not containing the current outer container unit;

halting the search at a first namespace in the search order containing the matching name; and binding the referencing name to a program object having the matching name in said first namespace.

19. The method of claim 18 wherein the outer container units contain modules, wherein the modules contain procedures, and wherein the step of searching for a matching name in an upward hierarchical order of the namespaces in the current outer container unit comprises:

if the referencing name appears in a current procedure, searching for a matching name in a namespace having a collection of names of program objects defined in the current procedure;

if the referencing name appears in a current module, searching for a matching name in a namespace having a collection of names of program objects defined in the current module; and searching for a matching name in a namespace having a collection of names defined in the current outer container unit.

20. The method of claim 18 wherein the step of searching for a matching name in downward hierarchical order of namespaces in a directly referenced outer container unit or library comprises:

searching for a matching name in a namespace having a collection of names defined in said directly referenced outer container unit or library; and for each module contained in said directly referenced outer container unit or library, searching for a matching name out of any public names in a namespace having a collection of names defined in the respective module.

21. The method of claim 18 wherein the step of searching according to the search order comprises:

for each module contained in a searched outer container unit, searching for a matching name out of any public names in a namespace having a collection of names defined in the respective module.

22. A computer-readable medium having computer-executable instructions for performing the steps recited in claim 18.

23. A computer-readable medium having computer-executable instructions thereon for performing method of referencing from within an inner text block contained in a first containment hierarchy of text blocks of a first source code project to a symbol declared in a foreign text block of another source code project or code library outside of the first containment hierarchy of the first source code project, the first containment hierarchy having an outermost text block at a top level and additional text blocks hierarchically arranged under the outermost text block according to their containment relationship to the outermost text block, the method comprising:

placing a reference designating the other source code project or code library in the outermost text block of the first containment hierarchy of the first source code project;

referencing to the symbol of the foreign text block via an unqualified symbol reference within the inner text block;

binding the unqualified symbol reference to the symbol of the foreign text block according to a binding method, the binding method comprising:

searching for a declared symbol that matches the unqualified symbol reference according to a search order of the namespaces having sets of symbols declared within text blocks of the first source code project that contain the inner text block as encountered in an upward order within the first containment hierarchy from the inner text block to the outermost text block of the first source code project, and then the namespaces having sets of symbols declared within the other source code project or code library; and binding the unqualified symbol reference to the first matching symbol located in said search order.

24. The computer-readable medium of claim 23 wherein the search order further comprises the namespaces having sets of symbols declared within any other source code project or code library designated by reference in the outermost text block of the first containment hierarchy of the first source code project, and wherein the search order of the namespaces having sets of symbols declared within such any other source code project is in order of the references to such other source code project or code library is encountered in the outermost text block of the first containment hierarchy of the first source code project.

* * * * *

UNITED STATES PATENT AND TRADEMARK OFFICE
CERTIFICATE OF CORRECTION

PATENT NO. : 6,083,282

DATED : July 4, 2000

INVENTOR(S) : Caron, et al.

It is certified that error appears in the above-identified patent and that said Letters Patent is hereby corrected as shown below:

| Col./Line | Error Reads | Should Read |
|---|---|---|
| 6/38 | cqnstants | constants |
| 6/42 | Public | Public |
| 6/42 | As Integer | As Integer |
| 6/43 | Private | Private |
| 6/43 | As Double | As Double |
| 6/55 | Type | Type |
| 6/56 | As Integer | As Integer |
| 6/57 | As Single | As Single |
| 6/58 | End Type | End Type |
| 7/6 | As Integer | As Integer |
| 7/10 | Sub | Sub |
| 7/10 | As Integer | As Integer |
| 7/13 | End Sub | End Sub |
| 8/60 | (6) | (7) |
| 11/26 | (7) | (8) |
| 11/26 | Option Explicit | Option Explicit |
| 14/53 | *ADD after client* | , said any outer container units not being contained in and not containing the current outer container unit; |
| 16/16 | performing method | performing a method |

Signed and Sealed this

Eighth Day of May, 2001

*Attest:*

NICHOLAS P. GODICI

*Attesting Officer*    *Acting Director of the United States Patent and Trademark Office*